(12) United States Patent
Sawanobori et al.

(10) Patent No.: US 10,100,236 B2
(45) Date of Patent: Oct. 16, 2018

(54) LIGHT CURABLE RESIN COMPOSITION

(71) Applicant: Henkel AG & Co. KGaA, Duesseldorf (DE)

(72) Inventors: Junichi Sawanobori, Kanagawa (JP); Chunfu Chen, Kanagawa (JP); Masao Kanari, Kanagawa (JP)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 15/293,957

(22) Filed: Oct. 14, 2016

(65) Prior Publication Data

US 2017/0029671 A1 Feb. 2, 2017

Related U.S. Application Data

(63) Continuation of application No. PCT/JP2014/061501, filed on Apr. 17, 2014.

(51) Int. Cl.
| | |
|---|---|
| *C09J 4/06* | (2006.01) |
| *C09J 135/00* | (2006.01) |
| *C08F 220/18* | (2006.01) |
| *C08L 75/16* | (2006.01) |
| *C08L 75/04* | (2006.01) |
| *C08L 75/14* | (2006.01) |
| *G02F 1/1333* | (2006.01) |
| *G02F 1/1335* | (2006.01) |
| *C09J 133/06* | (2006.01) |
| *C08F 222/10* | (2006.01) |

(52) U.S. Cl.
CPC ........... *C09J 135/00* (2013.01); *C08F 220/18* (2013.01); *C08L 75/04* (2013.01); *C08L 75/14* (2013.01); *C08L 75/16* (2013.01); *C09J 4/06* (2013.01); *G02F 1/13338* (2013.01); *G02F 1/133526* (2013.01); *C08F 2222/1086* (2013.01); *C09J 133/06* (2013.01); *C09J 2203/318* (2013.01); *C09J 2203/326* (2013.01); *G02F 2202/28* (2013.01)

(58) Field of Classification Search
CPC .................. C08J 135/00; C08F 220/18; C08F 2222/1086; C08F 2203/318; C08F 2203/326; C08F 2202/38; C09J 133/06; C08L 75/04; C08L 75/14; C08L 75/16
See application file for complete search history.

(56) References Cited

U.S. PATENT DOCUMENTS

| | | | |
|---|---|---|---|
| 5,132,389 A | 7/1992 | De Jaeger et al. | |
| 5,945,463 A * | 8/1999 | Kawabuchi | C08F 299/04 277/650 |

FOREIGN PATENT DOCUMENTS

| | | |
|---|---|---|
| CN | 1051563 | 5/1991 |
| CN | 102382579 | 3/2012 |
| CN | 103525355 | 1/2014 |
| JP | 2010132895 | 6/2010 |
| WO | 2012/036980 | 3/2012 |
| WO | 2014/028024 | 2/2014 |

OTHER PUBLICATIONS

International Search Report issued in connection with International Patent Application No. PCT/JP2014/061501 dated Jan. 27, 2015.

* cited by examiner

*Primary Examiner* — Sanza L. McClendon
(74) *Attorney, Agent, or Firm* — Steven C. Bauman

(57) ABSTRACT

The present application relates to a resin composition and in particular to a light-curable resin composition.

It is known to achieve a thixotropic behavior of an adhesive composition by adding an inorganic additive like fumed silica. Adding inorganic additives results in significant particle problems as fumed silica is a solid particle and affects the optical performance of the adhesive composition.

In accordance with the invention a particle free resin composition with a thixotropic behavior is provided. The inventive composition comprises a) 30 to 90 wt % of a urethane acrylate oligomer with a molecular weight greater than 15000, b) 2 to 40 wt % of a (meth)acrylate monomer having a benzene ring, and c) 0.2 to 10 wt % of a photo initiator.

11 Claims, No Drawings

LIGHT CURABLE RESIN COMPOSITION

TECHNICAL FIELD

The present application relates to a resin composition and in particular to a light-curable resin composition.

BACKGROUND ART

A light-curable resin composition can be used, in case it has the corresponding optical properties, in optical assembly applications such as liquid optically-clear adhesive for touch panel assemblies. Liquid optically-clear adhesive (LOCA) is a liquid-based bonding technology used in touch panels and display devices to bind the cover lens, plastic or other optical materials to the main sensor unit or to each other. Adhesives are used to improve the optical characteristics of the device as well as to improve other attributes such as durability.

For productivity during coating a low viscosity of the adhesive is desired, while higher viscosity is required for better lamination results.

WO 2012/036980 A2 discloses an adhesive composition which has a thixotropic behavior. Thixotropy is a shear thinning property. Certain gels and fluids that are thick (viscous) under static conditions will flow (become thin, less viscous) over time when shaken, agitated or otherwise stressed. It then takes a fixed time to return to a more viscous state. In accordance with the afore-mentioned document the thixotropic behavior of the adhesive composition is achieved by adding an inorganic additive like fumed silica. However, adding inorganic additives results in significant particle problems as fumed silica is a solid particle and affects the optical performance of the adhesive composition.

SUMMARY OF INVENTION

It is therefore the object of the present application to provide a particle-free liquid composition with a thixotropic behavior.

This object is solved by a light-curable resin composition comprising
a) 30 to 90 wt % of a urethane acrylate oligomer with a molecular weight of more than 15000,
b) 2 to 40 wt % of a (meth)acrylate monomer having a benzene ring, and
c) 0.2 to 10 wt % of a photoinitiator,
wherein the percent by weight refers to the total weight of the light-curable resin composition of the present invention.

Surprisingly, it was found that the above-mentioned light-curable resin composition shows a thixotropic behavior without the addition of a thixotropy initiating agent like fumed silica. As the use of such thixotropic agent is not required, the inventive light-curable resin composition does not have any particle issues and comprises a very good optical performance. The inventive composition is suitable, due to its good optical properties, for use in optical assembly application such as liquid optical clear adhesive for touch panel assemblies.

DESCRIPTION OF EMBODIMENTS

The term (meth)acrylate as used herein refers to either acrylates or (meth)acrylates.

The benzene ring of the (meth)acrylate can comprise one or more substituent(s)/group(s) other than hydrogen.

Urethane acrylates are well known to a person skilled in the art, they may for example be obtained by reaction of diisocyanates, preferably aliphatic diisocyanates, with hydroxyacrylates, or may for example be obtained by reaction of diisocyanates, preferably aliphatic diisocyanates, with hydroxyacrylates and polyols.

Preferred urethane acrylates, which can be used according to this invention, are for example UVA-002 and UVA-004 from Osaka Organic Chemical Co., Ltd. Other urethane acrylates can be used provided their molecular weight is greater than 15000.

The properties of the preferred urethane acrylates are as follows:

|  | UVA-002 | UVA-004 |
| --- | --- | --- |
| Mw | 20000 | 20000 |
| Viscosity (m * Pa * s) | 200000 | 170000 |
| Transmittance (%) | 99 | 99 |
| Haze (%) | 0.1 | 0.1 |

The (meth)acrylate monomer having a benzene ring can be selected from a group comprising benzyl acrylate, phenoxyethyl acrylate, nonylphenoxypolyethylene glycol acrylate, ethoxylated bisphenol A diacrylate, phenoxyethyl methacrylate, ethoxylated bisphenol A dimethacrylate, benzyl methacrylate, 1-phenylethyl methacrylate, 2-phenoxyethyl methacrylate, 2-phenylethyl methacrylate, 3-phenylpropyl methacrylate, 3-phenylpropyl acrylate and 2-phenoxyethyl acrylate and combinations thereof. The use of benzyl acrylate as (meth)acrylate monomer is preferred.

In particular, the (meth)acrylate monomer having a benzene ring can be selected from a group comprising

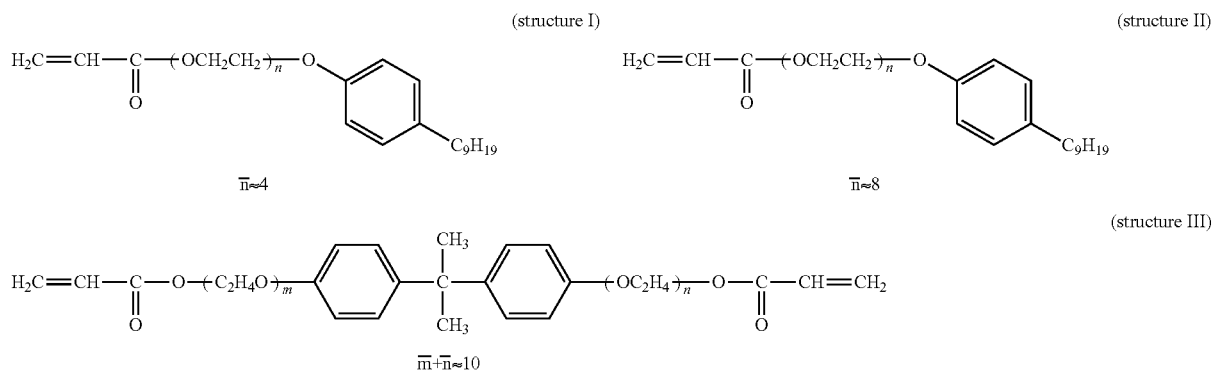

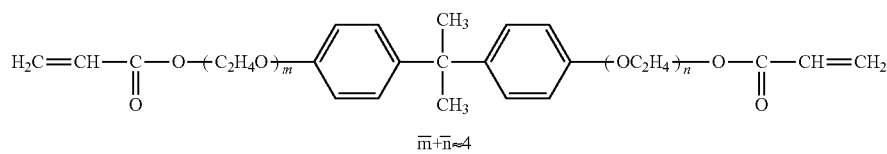
(structure IV)

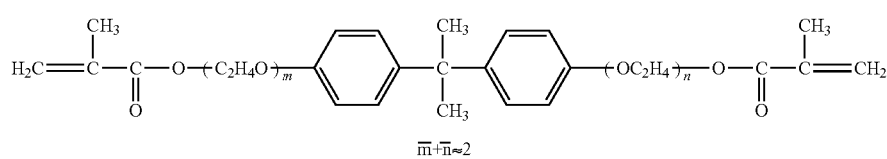
(structure V)

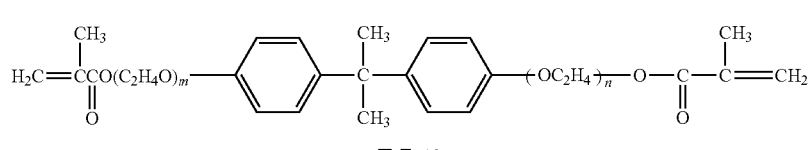
(structure VI)

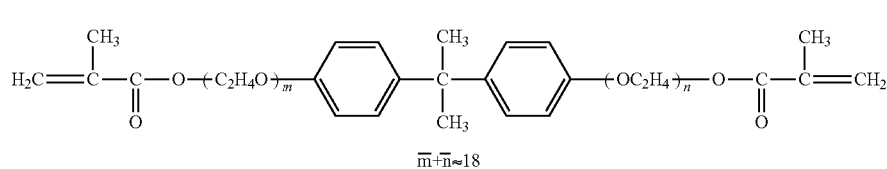
(structure VII)

While the inventive composition must contain at least one (meth)acrylate monomer having a benzene ring, the composition in accordance with the present invention can comprise one or more additional monomers like, for example, isobornyl acrylate, 4-hdroxybutyl acrylate and tricylodecane dimethanol diacrylate, wherein an additional monomer may be used to fine tune the properties of the resulting cured composition.

The composition in accordance with the present invention comprises at least one photoinitiator. A photoinitiator initiates the reaction and has a great influence on the curing of the composition, wherein different kinds of photoinitiators have different issues and advantages. For example, some photoinitiators cause discoloration of the cured compositions while others are particularly well suited for pigmented systems.

In accordance with the present invention it is preferred to select a photoinitiator from a group comprising phenylglyoxylates, α-hydroxyketones, α-aminoketones, benzildimethylketal, monoacylphosphinoxides, bisacylphosphinoxides, benzophenones, oxime esters, titanocene and combinations thereof.

It is preferred that the light-curable resin composition comprises
a) 40 to 80 wt % of a urethane acrylate oligomer with a molecular weight of more than 15000,
b) 5 to 30 wt % of a (meth)acrylate monomer having a benzene ring,
c) 0.5 to 6 wt % of a photo initiator.

It is more preferred that the light-curable resin composition comprises
a) 45 to 80 wt % of a urethane acrylate oligomer with a molecular weight of more than 15000,
b) 5 to 28 wt % of a (meth)acrylate monomer having a benzene ring,
c) 0.5 to 6 wt % of a photo initiator.

It is most preferred that the light-curable resin composition comprises
a) 50 to 80 wt % of a urethane acrylate oligomer with a molecular weight of more than 15000,
b) 5 to 25 wt % of a (meth)acrylate monomer having a benzene ring,
c) 0.5 to 6 wt % of a photo initiator.

The light-curable resin composition might comprise 0 to 40 wt %, preferably 0 to 30 wt %, other components such as deformer, ultra-violet light absorber, light stabilizer, silane coupling agents, an antioxidant or a combination thereof.

With regard to the other components it is preferred that the deformer (defoamer or an anti-foaming agent) is based on silicones and polymers. The antioxidant is preferably selected from a group comprising phenolic, aminic, sulphur-based antioxidants and multifunctional antioxidants or combinations thereof. The ultra-violet light absorber is preferably a benzotriazole type ultra-violet light absorber, and in particular 2-(5-t-butyl-2-hydroxyphenyl)benzotriazole.

A further aspect of the invention relates to the use of said light-curable resin composition for bonding parts of optical assemblies.

A further aspect of the invention relates to the use of said light-curable resin composition for touch panel sensor assemblies A further aspect of the invention relates to the use of said light-curable resin composition for cover lens bonding.

A further aspect of the invention relates to the use of said light-curable resin composition for directly bonding the cover lens to a LCD module.

Finally, a further aspect of the invention relates to the use of said light-curable resin composition on liquid crystal displays to fix the touch screen on the base substrate, wherein the base substrate can be a display panel, preferably selected from a liquid crystal display, a plasma display, a light-emitting diode (LED) display, an electrophoretic display, and a cathode ray tube display.

EXAMPLES

The following table 1 shows four compositions which were prepared by mixing all ingredients to obtain a homogeneous mixture away from light.

The first example comprises all essential components of the inventive composition, namely 30 to 90 wt % (67.7 wt %) of a urethane acrylate oligomer with a molecular weight greater than 15000 (UVA-002 has a molecular weight of 20000), 2 to 40 wt % (15.0 wt %) of a (meth)acrylate monomer having a benzene ring (benzyl acrylate) and 0.2 to 10 wt % (3.5 wt % in total) of a photo initiator (combination of TPO and Irgacure 184).

The table also comprises three comparative compositions which do not comprise all of the essential components.

As can be seen from table 2, only the composition in accordance with the present invention shows a significantly enhanced thixotropic ratio of 1.7. The compositions in accordance with prior art all show a thixotropic ratio of 1.0.

TABLE 1

Different light-curable resin compositions

| Components | | Example | Comparison 1 | Comparison 2 | Comparison 3 |
|---|---|---|---|---|---|
| Oligomer | UVA-002* urethane acrylate | 67.6 | | | 67.6 |
| | UC203* isoprene acrylate | | 67.6 | | |
| | UT5141* urethane acrylate | | | 67.6 | |
| Monomer | Benzyl acrylate | 15.0 | 15.0 | 15.0 | 0.8 |
| | Isobornyl acrylate | 5.2 | 5.2 | 5.2 | 15.0 |
| | 4-hydroxybutyl acrylate | 5.2 | 5.2 | 5.2 | 9.6 |
| | Tricylodecane dimethanol Diacrylate | 2.1 | 2.1 | 2.1 | 2.1 |
| Deformer | BYK-088* | 0.5 | 0.5 | 0.5 | 0.5 |
| Antioxidant | Irganox 1520L* | 0.6 | 0.6 | 0.6 | 0.6 |
| light stabilizer | TINUVIN PS* | 0.4 | 0.4 | 0.4 | 0.4 |
| Photoinitiator | TPO* | 0.9 | 0.9 | 0.9 | 0.9 |
| | Irgacure 184* | 2.6 | 2.5 | 2.5 | 2.5 |
| | | 100.0 | 100.0 | 100.0 | 100.0 |

TABLE 2

Characteristics of the light-curable resin compositions

| | Example | Comparison 1 | Comparison 2 | Comparison 3 |
|---|---|---|---|---|
| Viscosity | 150,000 mPa · s | 60,000 mPa · s | 20,000 mPa · s | 160,000 mPa · s |
| Thixotropic ratio, 1 sec$^{-1}$/10 sec$^{-1}$ | 1.7 | 1.0 | 1.0 | 1.0 |
| Transmittance (%) @550 nm | 99.0 | 99.0 | 99.0 | 99.0 |
| Y.I. (b*) | 0.22 | 0.10 | 0.08 | 0.18 |
| Haze (%) | 0.1 | 0.1 | 0.1 | 0.1 |

For viscosity and thixotropic ratio (ratio of viscosity@1 Sec−1 and 10 Sec−1 shear rate), HAAKE Reometer was used according to ASTM D 1084.

*UC203: isoprene acrylate oligomer with MW of 5000~8000, from Kuraray Co. Ltd.
*UT5141: urethane acrylate oligomer with MW of 6000~10000, by Nipon Gosei Co., Ltd.
*UVA002: urethane acrylate oligomer with MW of 20000, by Osaka Organic Chemical Ind., Ltd.
*BYK-088: by BYK
*Irganox 1520L, TINUVIN PS, TPO and Irgacure: all from BASF Transmittance and Y.I (b*) were measured with UV-Vis spectrometer according to ASTM E 903 and ASTM D1003, respectively.

Haze was measured with Haze detector according to ASTM D 1003.

What is claimed is:

1. An optical device comprising:
   a) a touch screen; and
   b) a base substrate selected from a display panel, a liquid crystal display, a plasma display, a light emitting display, an electrophenetic display and a cathode ray display, wherein the touch screen and the base substrate are adhered to one another by a cured reaction product of a composition comprising a light-curable composition, comprising
      a) 30 to 90 wt % of a urethane acrylate oligomer with a molecular weight greater than 15000,
      b) 2 to 40 wt % of a (meth)acrylate monomer having a benzene ring, and
      c) 0.2 to 10 wt % of a photo initiator.

2. The device according to claim 1, wherein the urethane acrylate oligomer is an aliphatic urethane acrylate.

3. The device according to claim 1, wherein the (meth) acrylate monomer having a benzene ring is a member selected from the group consisting of benzyl acrylate, phenoxyethyl acrylate, nonylphenoxypolyethylene glycol acrylate, ethoxylated bisphenol A diacrylate, phenoxyethyl methacrylate, ethoxylated bisphenol A dimethacrylate, benzyl methacrylate, 1-phenylethyl methacrylate, 2-phenoxyethyl methacrylate, 2-phenylethyl methacrylate, 3-phenylpropyl methacrylate, 3-phenylpropyl acrylate and 2-phenoxyethyl acrylate and combinations thereof.

4. The device according to claim 3, wherein the (meth) acrylate monomer having a benzene ring is a member selected from the group consisting of

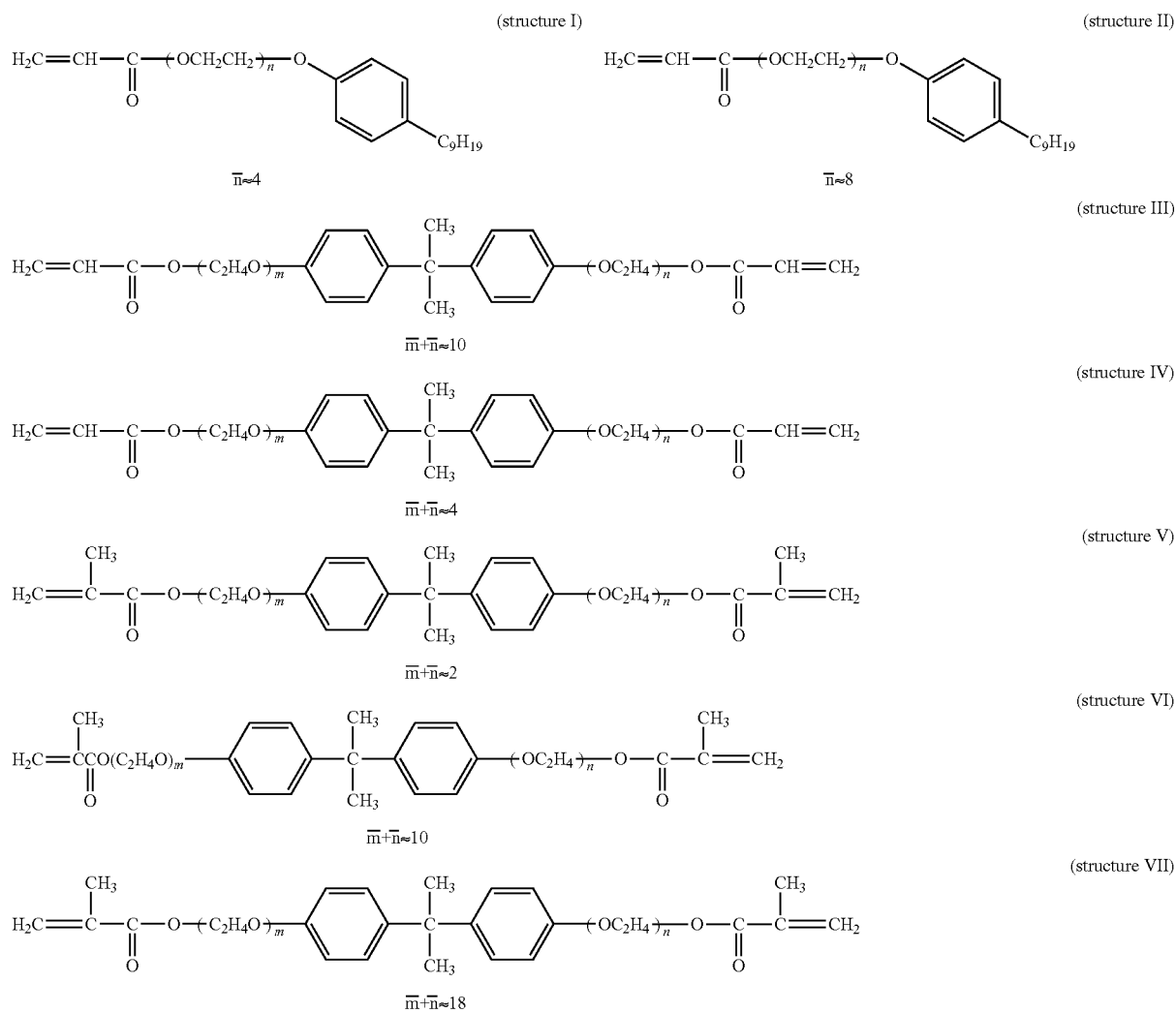

5. The device according to claim 1, wherein the photoinitiator is a member selected from the group consisting of phenylglyoxylates, α-hydroxyketones, α-aminoketones, benzildimethylketal, monoacylphosphinoxides, bisacylphosphinoxides, benzophenones, oxime esters, titanocene and combinations thereof.

6. The according to claim 1, wherein the composition comprises:
   a) 40 to 80 wt % of a urethane acrylate oligomer with a molecular weight of more than 15000,
   b) 5 to 30 wt % of a (meth)acrylate monomer having a benzene ring, and
   c) 0.5 to 6 wt % of a photo initiator.

7. The device according to claim 1, wherein the composition further comprises up to 40 wt % deformer, ultra-violet light absorber, light stabilizer, silane coupling agent, antioxidant and combinations thereof.

8. The device according to claim 7, wherein the deformer is based on silicones.

9. The device according to claim 7, wherein the antioxidant is a member selected from the group consisting of phenolic, aminic, sulphur-based antioxidants and multifunctional antioxidants or combinations thereof.

10. The device according to claim 7, wherein the ultra-violet light absorber is a benzotriazole type ultra-violet light absorber.

11. The device according to claim 1, wherein the composition comprises
    a) 40 to 80 wt % of a urethane acrylate oligomer with a molecular weight of more than 20,000,
    b) 5 to 30 wt % of a (meth)acrylate monomer having a benzene ring, and
    c) 0.5 to 6 wt % of a photo initiator,
wherein the composition has a thixotropic ratio of 1.7.

* * * * *

UNITED STATES PATENT AND TRADEMARK OFFICE
CERTIFICATE OF CORRECTION

PATENT NO. : 10,100,236 B2
APPLICATION NO. : 15/293957
DATED : October 16, 2018
INVENTOR(S) : Junichi Sawanobori, Chunfu Chen and Masao Kanari It is certified that error appears in the above-identified patent and that said Letters Patent is hereby corrected as shown below:

In the Claims

Column 7, Line 49, Claim 6 change "The according to Claim 1" to -- The device according to Claim 1 --

Column 8, Line 49, Claim 10 change "The according to Claim 7" to -- The device according to Claim 7 --

Signed and Sealed this
Eighteenth Day of June, 2019

Andrei Iancu
*Director of the United States Patent and Trademark Office*